(12) United States Patent
Wu

(10) Patent No.: US 8,204,539 B2
(45) Date of Patent: Jun. 19, 2012

(54) ANALOG PROCESSING DEVICE FOR A DATA TRANSMISSION DEVICE

(75) Inventor: Wen-Chieh Wu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 783 days.

(21) Appl. No.: 12/167,220

(22) Filed: Jul. 2, 2008

(65) Prior Publication Data

US 2009/0247238 A1 Oct. 1, 2009

(30) Foreign Application Priority Data

Apr. 1, 2008 (TW) ............................... 97111861 A

(51) Int. Cl.
*H04M 1/00* (2006.01)
*H04B 1/38* (2006.01)
*H04B 5/00* (2006.01)

(52) U.S. Cl. .................. 455/556.1; 455/557; 455/556.2; 455/575.1; 455/90.3

(58) Field of Classification Search ............... 455/550.1, 455/552.1, 553.1, 554.1, 555, 556.1, 557, 455/556.2
See application file for complete search history.

(56) References Cited

U.S. PATENT DOCUMENTS 5,884,190 A * 3/1999 Lintula et al. ................. 455/557

2004/0204144 A1* 10/2004 Lim ............................... 455/566
2005/0003761 A1* 1/2005 Chandley ..................... 455/41.3
2007/0155332 A1* 7/2007 Burgan et al. .............. 455/67.11

FOREIGN PATENT DOCUMENTS

CN 1862454 A 11/2006
TW 200640267 11/2006

OTHER PUBLICATIONS

Office action mailed on Oct. 12, 2010 for the China application No. 200810090693.2, p. 3 line 4~30, p. 4 line 1~3 and line 14~22, p. 5 line 2~30, p. 6 line 1~12 and line 22~30 and p. 7 line 10~15.
Office action mailed on Nov. 22, 2011 for the Taiwan application No. 097111861, p. 1 line 6~14 and p. 2~4.
Office action mailed on Aug. 17, 2011 for the China application No. 200810090693.2, p. 3 line 2-31 and p. 4.

* cited by examiner

*Primary Examiner* — Tilahun B Gesesse
(74) *Attorney, Agent, or Firm* — Winston Hsu; Scott Margo

(57) ABSTRACT

In order to put the voice transmission function of a data transmission device into practice, the present invention provides an analog processing device for a data transmission device, which includes an analog signal processing unit for performing analog signal processes on an input signal received by the data transmission device and an output signal transmitted by the data transmission device, an audio interface unit coupled to the analog signal processing unit, for transmitting the input signal and the output signal, an output unit coupled to the audio interface unit, for transmitting the output signal from the audio interface unit to an external device, and an input unit coupled to the audio interface unit, for transmitting the input signal from the external device to the audio interface unit.

24 Claims, 2 Drawing Sheets

ANALOG PROCESSING DEVICE FOR A DATA TRANSMISSION DEVICE

BACKGROUND OF THE INVENTION

1. Field of the Invention

The present invention relates to an analog processing device for a data transmission device, and more particularly, to an analog processing device utilized for voice transmission.

2. Description of the Prior Art

With the advancement in communications technology and the demand for mobile communication and high-speed data transmission in modern life, there are more and more portable electronic equipments such as mobile phones and laptop computers that support the $3^{rd}$ generation mobile communications standards in the market, for high quality data and voice transmission. Usually, a high-speed data transmission device, such as a wireless data card, is connected with a laptop computer via a PCMCIA or USB interface for data transmission.

However, even if the hardware design of the data card itself supports the $3^{rd}$ generation mobile communications standards, the benefit of the data card cannot be put into practice completely as a result of a lack of appropriate peripheral devices. For example, a common data card is equipped with a connector for data transmission so that the data card can be installed on a laptop computer, but the data card that is also equipped with voice transmission interface inside is not equipped with a connector accordingly, such as a phone jack, so that the voice transmission function of the data card cannot be used.

SUMMARY OF THE INVENTION

It is therefore a primary objective of the claimed invention to provide an analog processing device for a data transmission device.

The present invention discloses an analog processing device for a data transmission device, which comprises an analog signal processing unit for performing analog signal processes on an input signal received by the data transmission device and an output signal transmitted by the data transmission device, an audio interface unit coupled to the analog signal processing unit, for transmitting the input signal and the output signal, an output unit coupled to the audio interface unit, for transmitting the output signal from the audio interface unit to an external device, and an input unit coupled to the audio interface unit, for transmitting the input signal from the external device to the audio interface unit.

The present invention further discloses a data transmission device for transmitting audio signals, which comprises an antenna for receiving an input signal and transmitting an output signal, a radio frequency processing device coupled to the antenna, for performing radio frequency signal processes on the input signal and the output signal, a digital processing device coupled to the radio frequency processing unit, for performing digital signal processes on the input signal and the output signal, and an analog processing device coupled to the digital processing unit. The analog processing device comprises an analog signal processing unit for performing analog signal processes on the input signal and the output signal, an audio interface unit coupled to the analog signal processing unit, for transmitting the input signal and the output signal, an output unit coupled to the audio interface unit, for transmitting the output signal from the audio interface unit to an external device, and an input unit coupled to the audio interface unit, for transmitting the input signal from the external device to the audio interface unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
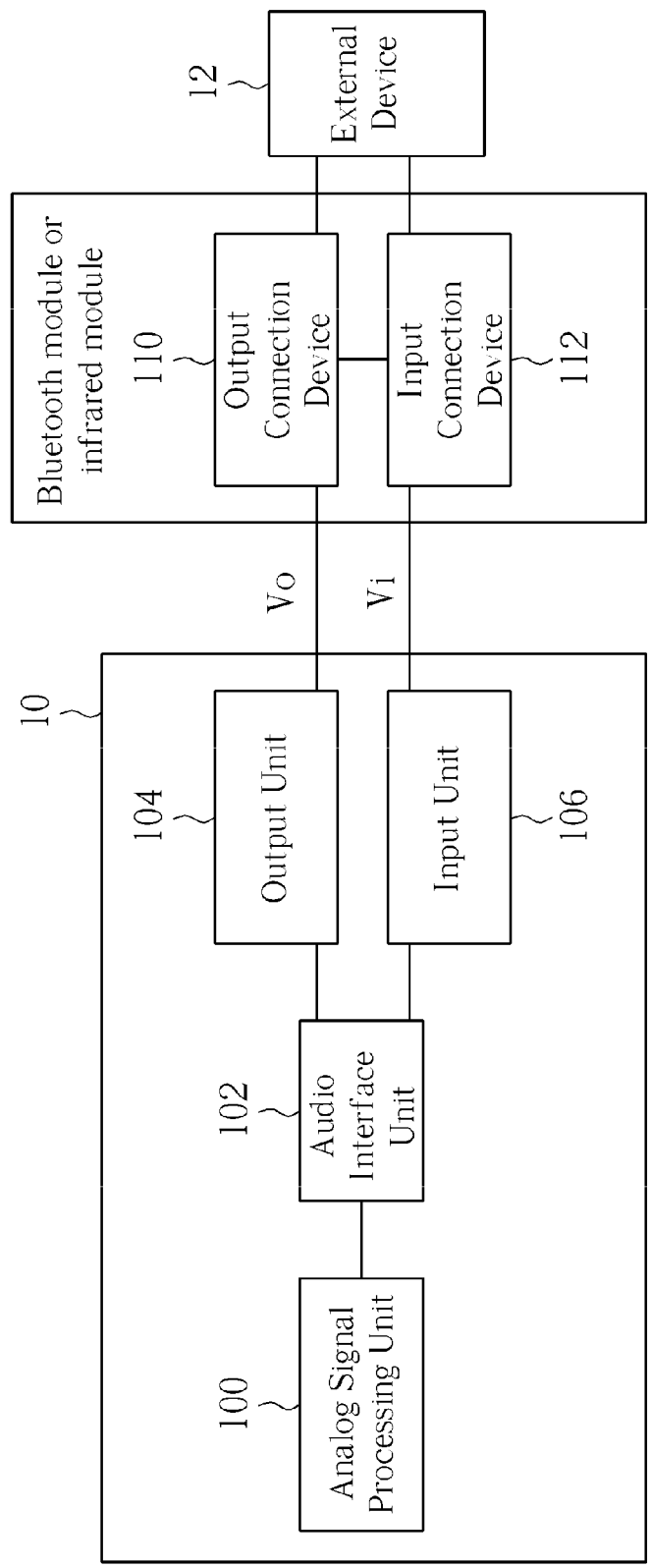
FIG. 1 is a block diagram of an analog processing device according to an embodiment of the present invention.

Please refer to FIG. 1, which illustrates a block diagram of an analog processing device 10 according to an embodiment of the present invention. The analog processing device 10 is utilized for a data transmission device, such as a wireless data card. The analog processing device 10 comprises an analog signal processing unit 100, an audio interface unit 102, an output unit 104 and an input unit 106. The analog signal processing unit 100 is utilized for performing analog signal processes on an input signal Vi received by the data transmission device and an output signal Vo transmitted by the data transmission device. The input signal Vi and the output signal Vo are voice signals. The audio interface unit 102 is coupled to the analog signal processing unit 100 and utilized for transmitting the input signal Vi and the output signal Vo. The output unit 104 is coupled to the audio interface unit 102 and an external device 12, and utilized for transmitting the output signal Vo from the audio interface unit 102 to the external device 12. The input unit 106 is coupled to the audio interface unit 102 and the external device 12, and utilized for transmitting the input signal from the external device 12 to the audio interface unit 102.

The prior art analog processing device of data transmission device comprises an audio interface unit but does not comprise I/O interfaces, such as connectors or phone jacks, for connecting the audio interface unit with an external device, thereby the voice transmission function in the data transmission device cannot be used. Preferably, the analog processing device 10 according to the embodiment of the present invention provides the output unit 104 and the input unit 106 as I/O interfaces, so that the audio interface unit 102 is coupled to the external device 12 via the output unit 104 and the input unit 106. Therefore, the voice transmission function in the data transmission device is really used. For example, the output unit 104 is a speaker jack; the input unit 106 is a microphone jack; the external device 12 is a headphone with microphone or a computer.

In addition, the analog processing device according to another embodiment of the present invention further comprises an output connection device 110 and an input connection device 112, as shown in FIG. 1. The output connection device 110 is coupled between the output unit 204 and the external device 12 and utilized for transmitting the output signal Vo from the output unit 104 to the external device 12. The input connection device 112 is coupled between the input unit 106 and the external device 12, and utilized for transmitting the input signal Vi from the external device 12 to the input unit 106. The output connection device 110 and the input connection device 112, for example, can be wired transmission devices, such as transmission cables connected to a computer equipped with line-in/line-out jacks, or cables of a headphone with microphone. On the other hand, the output connection device 110 and the input connection device 112 can be wireless transmission devices and integrated as a Bluetooth module or an infrared module.

Figure 2:
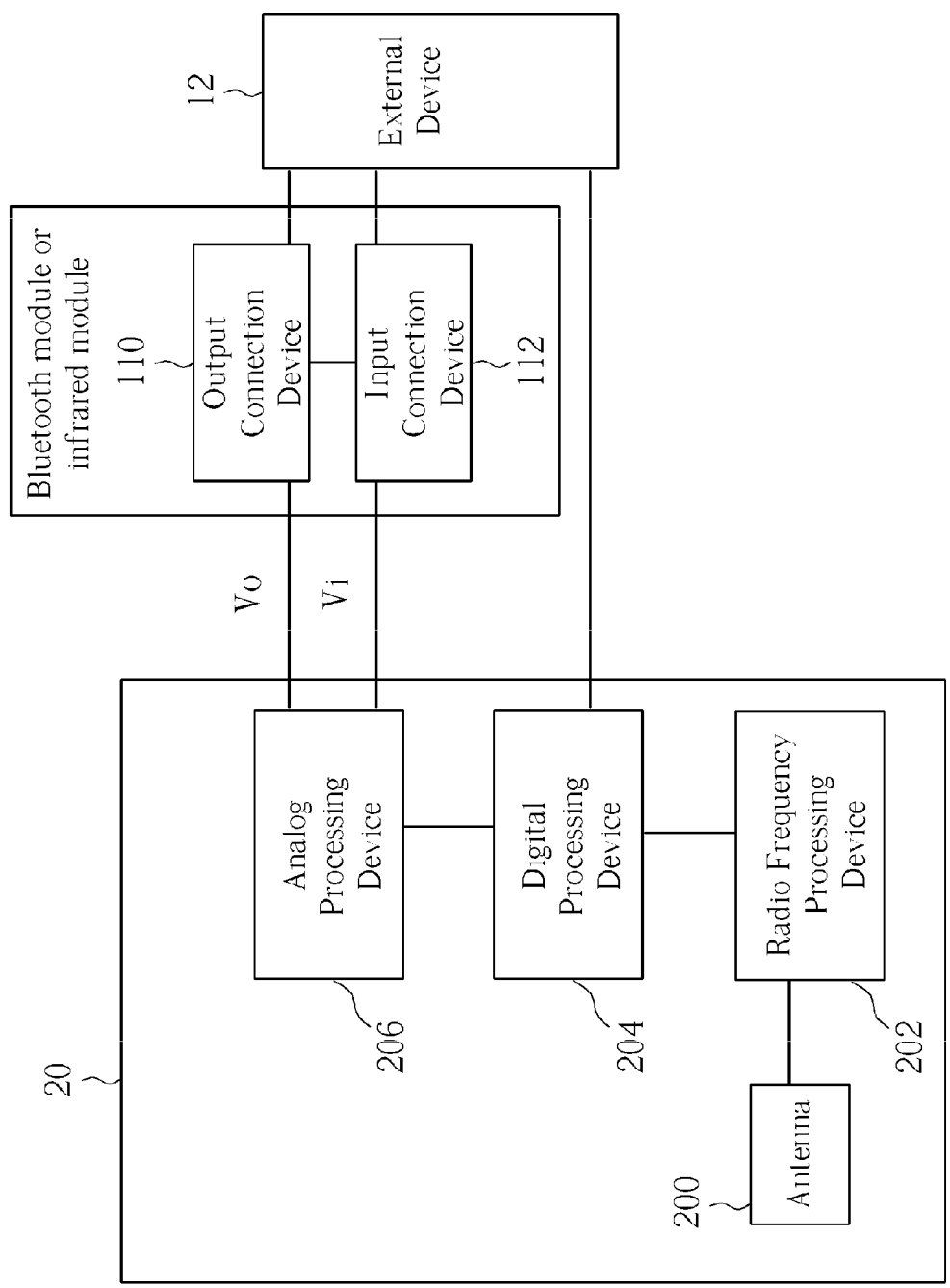
FIG. 2 is a block diagram of a data transmission device according to an embodiment of the present invention.

From the above, when a data transmission device, such as a data card, uses the analog processing device 10, the data transmission device will be capable of really providing voice transmission service. Please refer to FIG. 2, which illustrates a block diagram of a data transmission device 20 according to an embodiment of the present invention. The data transmission device 20 comprises an antenna 200, a radio frequency (RF) processing device 202, a digital processing device 204 and an analog processing device 206. The antenna 200 is utilized for receiving an input signal and transmitting an output signal. The RF processing device 202 is coupled to the antenna 200 and utilized for performing RF signal processes on the input signal and the output signal. The digital processing device 204 is coupled to the RF processing device 202 and utilized for performing digital signal processes on the input signal and the output signal. The analog processing device 206 is coupled to the digital processing unit 204 and utilized for performing analog signal processes on the input signal and the output signal. The structure and operations of the analog processing device 206 is identical to the analog processing device 10 in FIG. 1 and is not given here. Therefore, the data transmission device 20 can provide voice transmission service via the analog processing device 206 to the user.

In addition, similar to the analog processing device 10, the analog processing device 206 transmits/receives voice data to/from the external device 12 via the output connection device 110 and the input connection device 112. The user can select what to use as the external device 12, such as a headphone with microphone or a computer with built-in headphone and microphone. On the other hand, the digital processing device 204 is connected to a computer via a PCMCIA interface or a USB interface. The user interface (UI) of the computer has to support dialing/answering functions so that the voice transmission function of the data transmission device 20 is implemented.

In conclusion, the present invention connects the audio interface unit with the external device via the output unit and the input unit, such as phone jacks, so that the user can use the voice transmission function in the data transmission device. In addition, the present invention further provides the output connection device and the input connection device accordingly, such as cables or wireless devices for connecting the data transmission device with the external device, so that the user can select required audio equipments.

Those skilled in the art will readily observe that numerous modifications and alterations of the device and method may be made while retaining the teachings of the invention.

What is claimed is:

1. An analog processing device for a data transmission device comprising:
    an analog signal processing unit for performing analog signal processes on an input signal received by the data transmission device and an output signal transmitted by the data transmission device;
    an audio interface unit coupled to the analog signal processing unit, for transmitting the input signal and the output signal;
    an output unit coupled to the audio interface unit, for transmitting the output signal from the audio interface unit to an external device; and
    an input unit coupled to the audio interface unit, for transmitting the input signal from the external device to the audio interface unit;
    wherein the data transmission device is connected to a computer via a data transmission interface.

2. The analog processing device of claim 1, further comprising an output connection device coupled between the output unit and the external device, for transmitting the output signal from the output unit to the external device.

3. The analog processing device of claim 2, wherein the output connection device is a wired transmission device.

4. The analog processing device of claim 3, wherein the wired transmission device is a transmission cable.

5. The analog processing device of claim 2, wherein the output connection device is a wireless transmission device.

6. The analog processing device of claim 5, wherein the wireless transmission device is a Bluetooth device or an infrared device.

7. The analog processing device of claim 1, further comprising an input connection device coupled between the input unit and the external device, for transmitting the input signal from the external device to the input unit.

8. The analog processing device of claim 7, wherein the input connection device is a wired transmission device.

9. The analog processing device of claim 8, wherein the wired transmission device is a transmission cable.

10. The analog processing device of claim 7, wherein the input connection device is a wireless transmission device.

11. The analog processing device of claim 10, wherein the wireless transmission device is a Bluetooth device or an infrared device.

12. The analog processing device of claim 1, wherein the external device is a headphone with microphone.

13. A data transmission device for transmitting audio signals comprising:
    an antenna for receiving an input signal and transmitting an output signal;
    a radio frequency processing device coupled to the antenna, for performing radio frequency signal processes on the input signal and the output signal;
    a digital processing device coupled to the radio frequency processing unit, for performing digital signal processes on the input signal and the output signal; and
    an analog processing device coupled to the digital processing unit, comprising:
        an analog signal processing unit for performing analog signal processes on the input signal and the output signal;
        an audio interface unit coupled to the analog signal processing unit, for transmitting the input signal and the output signal;
        an output unit coupled to the audio interface unit, for transmitting the output signal from the audio interface unit to an external device; and
        an input unit coupled to the audio interface unit, for transmitting the input signal from the external device to the audio interface unit;
    wherein the data transmission device is connected to a computer via a data transmission interface.

14. The data transmission device of claim 13, further comprising an output connection device coupled between the output unit and the external device, for transmitting the output signal from the output unit to the external device.

15. The data transmission device of claim 14, wherein the output connection device is a wired transmission device.

16. The data transmission device of claim 15, wherein the wired transmission device is a transmission cable.

17. The data transmission device of claim 14, wherein the output connection device is a wireless transmission device.

18. The data transmission device of claim 17, wherein the wireless transmission device is a Bluetooth device or an infrared device.

19. The data transmission device of claim 13, further comprising an input connection device coupled between the input unit and the external device, for transmitting the input signal from the external device to the input unit.

20. The data transmission device of claim 19, wherein the input connection device is a wired transmission device.

21. The data transmission device of claim 20, wherein the wired transmission device is a transmission cable.

22. The data transmission device of claim 19, wherein the input connection device is a wireless transmission device.

23. The data transmission device of claim 22, wherein the wireless transmission device is a Bluetooth device or an infrared device.

24. The data transmission device of claim 13, wherein the external device is a headphone with microphone.

* * * * *